United States Patent
Danileiko (10) Patent No.: US 9,942,268 B1
(45) Date of Patent: Apr. 10, 2018

(54) SYSTEMS AND METHODS FOR THWARTING UNAUTHORIZED ATTEMPTS TO DISABLE SECURITY MANAGERS WITHIN RUNTIME ENVIRONMENTS

(71) Applicant: Symantec Corporation, Mountain View, CA (US)

(72) Inventor: Alexander Danileiko, Irvine, CA (US)

(73) Assignee: Symantec Corporation, Mountain View, CA (US)

( * ) Notice: Subject to any disclaimer, the term of this patent is extended or adjusted under 35 U.S.C. 154(b) by 79 days.

(21) Appl. No.: 14/822,927

(22) Filed: Aug. 11, 2015

(51) Int. Cl.
H04L 29/06 (2006.01)
H04L 29/08 (2006.01)

(52) U.S. Cl.
CPC ...... *H04L 63/1466* (2013.01); *H04L 63/1408* (2013.01); *H04L 67/02* (2013.01); *H04L 67/10* (2013.01)

(58) Field of Classification Search
CPC .................................................. H04L 63/1466
USPC .......................................................... 726/23
See application file for complete search history.

(56) References Cited

U.S. PATENT DOCUMENTS

2007/0180509 A1* 8/2007 Swartz .................. G06F 9/4406 726/9
2009/0077664 A1* 3/2009 Hsu ....................... G06F 21/566 726/24
2012/0110344 A1 5/2012 Sadovsky et al.
2012/0317647 A1 12/2012 Brumley et al.
2013/0111587 A1 5/2013 Goel et al.
2016/0294800 A1 10/2016 Oppenheim, Jr. et al.
2016/0352608 A1 12/2016 Cornell et al.

OTHER PUBLICATIONS

Joseph Chen, et al.; Systems and Methods for Detecting Unknown Vulnerabilities in Computing Processes; U.S. Appl. No. 14/822,930, filed Aug. 11, 2015.
"Hooking", https://en.wikipedia.org/wiki/Hooking, as accessed Jul. 22, 2015, Wikipedia, (Dec. 15, 2005).

(Continued)

Primary Examiner — Jacob Lipman
(74) Attorney, Agent, or Firm — FisherBroyles, LLP (57) ABSTRACT

The disclosed computer-implemented method for thwarting unauthorized attempts to disable security managers within runtime environments may include (1) monitoring a runtime environment that (A) facilitates execution of an application and (B) includes a security manager that prevents the application from performing unauthorized actions while running within the runtime environment, (2) detecting, while monitoring the runtime environment, an attempt to disable the security manager such that the security manager no longer prevents the application from performing the unauthorized actions, (3) identifying a source of the attempt to disable the security manager, (4) determining that the source of the attempt is not authorized to disable the security manager, and then (5) blocking the attempt to disable the security manager such that the security manager continues to prevent the application from performing the unauthorized actions while running within the runtime environment. Various other methods, systems, and computer-readable media are also disclosed.

14 Claims, 5 Drawing Sheets

(56) References Cited

OTHER PUBLICATIONS

"Exception handling", https://en.wikipedia.org/wiki/Exception_handling, as accessed Jul. 22, 2015, Wikipedia, (Jul. 10, 2004).
"Zero-day (computing)", https://en.wikipedia.org/wiki/Zero-day_(computing), as accessed Jul. 22, 2015, Wikipedia, (Jun. 14, 2015).
"FireEye", https://www.fireeye.com/, as accessed Jul. 22, 2015, (Oct. 12, 1999).
Andrew Watson, et al.; Systems and Methods for Identifying Detection-Evasion Behaviors of Files Undergoing Malware Analyses; U.S. Appl. No. 14/567,440, filed Dec. 11, 2014.

\* cited by examiner

SYSTEMS AND METHODS FOR THWARTING UNAUTHORIZED ATTEMPTS TO DISABLE SECURITY MANAGERS WITHIN RUNTIME ENVIRONMENTS

BACKGROUND

Runtime environments (such as JAVA RUNTIME ENVIRONMENT) often facilitate the execution of applets. For example, a webpage may host an applet. In this example, a user of a computing device may access the applet by navigating to the webpage within a browser. As the user navigates to the webpage, a runtime environment installed on the user's computing device may launch a virtual machine that executes the applet in connection with the browser.

Some runtime environments may include a security manager that prevents applets from executing unauthorized actions. For example, a security manager may prevent applets running within a runtime environment from initiating unauthorized file downloads to a user's computing device. Additionally or alternatively, the security manager may prevent applets running within the runtime environment from accessing, exporting, and/or modifying certain data stored on the user's computing device. Unfortunately, the runtime environment may have certain vulnerabilities that allow applets to disable the security manager. Upon disabling the security manager, these applets may be able to perform unauthorized actions without supervision or restriction from the security manager.

The instant disclosure, therefore, identifies and addresses a need for additional and improved systems and methods for thwarting unauthorized attempts to disable security managers within runtime environments.

SUMMARY

As will be described in greater detail below, the instant disclosure describes various systems and methods for thwarting unauthorized attempts to disable security managers within runtime environments. In one example, a computer-implemented method for thwarting unauthorized attempts to disable security managers within runtime environments may include (1) monitoring a runtime environment that (A) facilitates execution of an application and (B) includes a security manager that prevents the application from performing unauthorized actions while running within the runtime environment, (2) detecting, while monitoring the runtime environment, an attempt to disable the security manager such that the security manager no longer prevents the application from performing the unauthorized actions, (3) identifying a source of the attempt to disable the security manager, (4) determining that the source of the attempt is not authorized to disable the security manager, and then in response to determining that the source of the attempt is not authorized to disable the security manager, (5) blocking the attempt to disable the security manager such that the security manager continues to prevent the application from performing the unauthorized actions while running within the runtime environment.

In one example, the method may also include inserting a hook within an Application Programming Interface (API) that facilitates disabling the security manager to intercept each call to the API. In this example, the method may further include detecting a call to the API by hooking the call with the hook inserted within the API. Additionally or alternatively, the method may include transferring the flow of execution from the API to a different function that facilitates identifying a source of the call.

In one example, the method may also include identifying the source as having initiated the call to the API by determining that the call to the API originated from the source. For example, the method may include tracing a code path of the call to the API back to the source. In this example, the source may include and/or represent the application running within the runtime environment. Additionally or alternatively, the source may include and/or represent another application running within the runtime environment.

In one example, the method may also include ensuring that the source of the attempt is not the runtime environment itself. Additionally or alternatively, the method may include determining that the source of the attempt is an unsigned application running within the runtime environment. In one example, the method may also include blacklisting the source of the attempt such that the source is no longer able to run within the runtime environment.

In one example, the method may also include detecting another attempt to disable the security manager such that the security manager no longer prevents the application from performing the unauthorized actions. In this example, the method may further include identifying a source of the other attempt to disable the security manager and then determining that the source of the other attempt is authorized to disable the security manager. Additionally or alternatively, the method may include refraining from blocking the other attempt to disable the security manager in response to determining that the source of the other attempt is authorized to disable the security manager.

As another example, a system for implementing the above-described method may include (1) a monitoring module, stored in memory, that (A) monitors a runtime environment that (I) facilitates execution of an application and (II) includes a security manager that prevents the application from performing unauthorized actions while running within the runtime environment and (B) detects, while monitoring the runtime environment, an attempt to disable the security manager such that the security manager no longer prevents the application from performing the unauthorized actions, (2) a determination module, stored in memory, that (A) identifies a source of the attempt to disable the security manager and (B) determines that the source of the attempt is not authorized to disable the security manager, (3) a security module, stored in memory, that blocks the attempt to disable the security manager such that the security manager continues to prevent the application from performing the unauthorized actions in response to the determination that the source of the attempt is not authorized to disable the security manager, and (4) at least one physical processor configured to execute the monitoring module, the determination module, and the security module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor a runtime environment that (A) facilitates execution of an application and (B) includes a security manager that prevents the application from performing unauthorized actions while running within the runtime environment, (2) detect, while monitoring the runtime environment, an attempt to disable the security manager such that the security manager no longer prevents the application from performing the unauthorized actions, (3)

identify a source of the attempt to disable the security manager, (4) determine that the source of the attempt is not authorized to disable the security manager, and then in response to determining that the source of the attempt is not authorized to disable the security manager, (5) block the attempt to disable the security manager such that the security manager continues to prevent the application from performing the unauthorized actions while running within the runtime environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for thwarting unauthorized attempts to disable security managers within runtime environments. As will be explained in greater detail below, by monitoring a runtime environment that facilitates the execution of applications, the systems and methods described herein may be able to detect any attempts to disable the runtime environment's security manager that prevents the applications from performing unauthorized actions. Upon detecting an attempt to disable the runtime environment's security manager, the systems and methods described herein may determine whether the source that initiated the attempt is authorized to disable the security manager.

In the event that the source is not authorized to disable the security manager, the systems and methods described herein may block the attempt so that the security manager continues to prevent the applications from performing authorized actions. By blocking the attempt in this way, the systems and methods described herein may improve and/or enhance the security of the runtime environment and/or the computing device that executes the runtime environment. In particular, these security improvements and/or enhancements may ensure that applications running within the runtime environment are unable to initiate unauthorized file downloads to the computing device and/or access, export, or modify certain data stored on the computing device.

Figure 1:
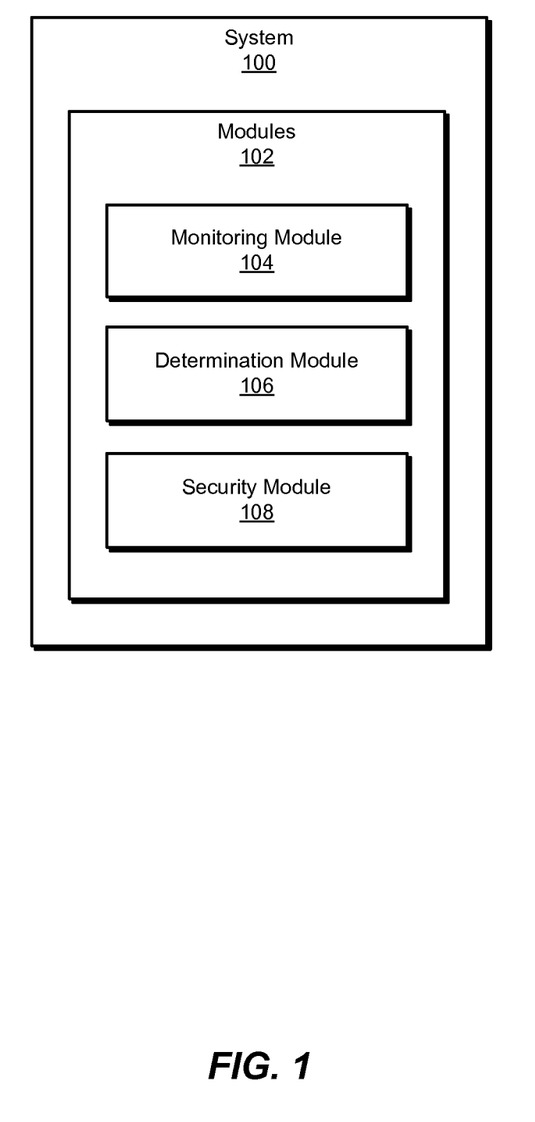
FIG. 1 is a block diagram of an exemplary system for thwarting unauthorized attempts to disable security managers within runtime environments.
Figure 2:
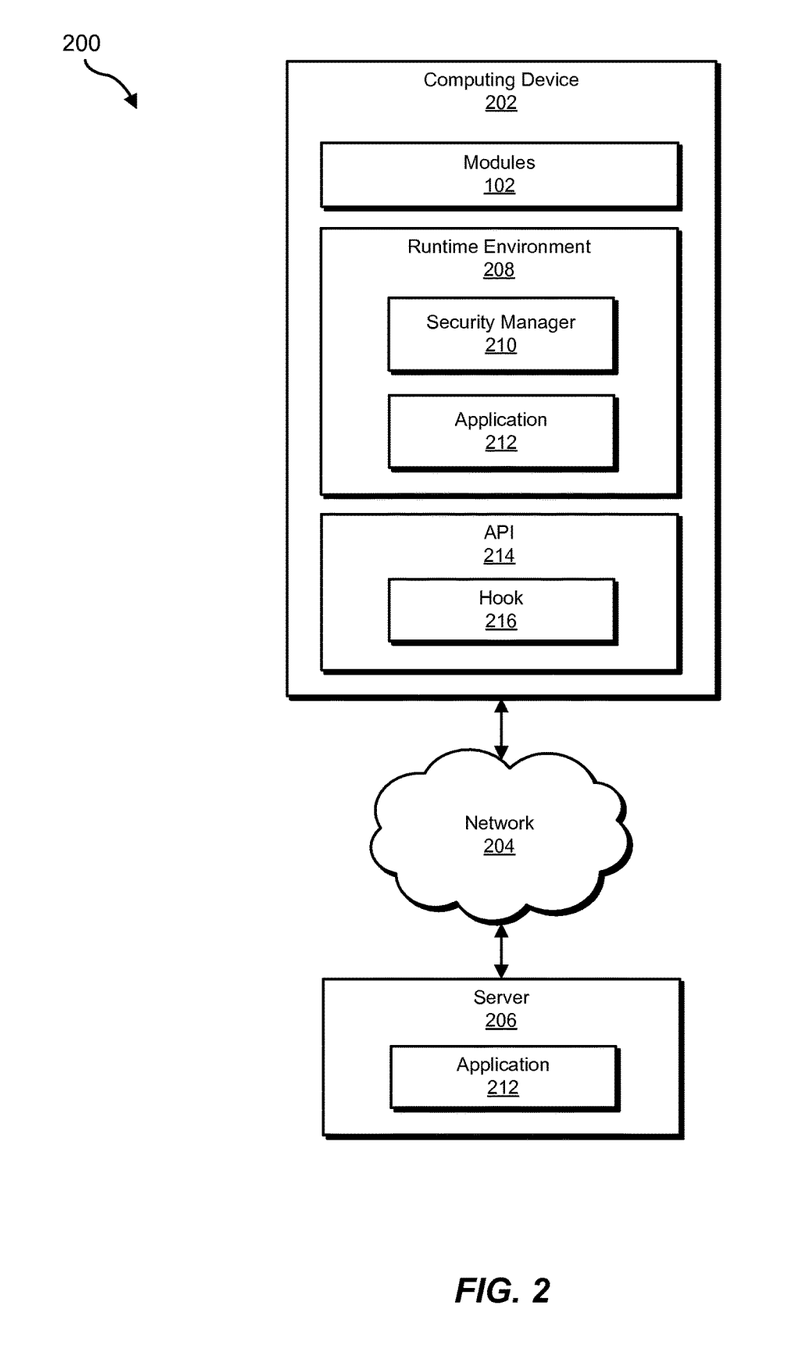
FIG. 2 is a block diagram of an additional exemplary system for thwarting unauthorized attempts to disable security managers within runtime environments.

The following will provide, with reference to FIGS. 1-2, detailed descriptions of exemplary systems for thwarting unauthorized attempts to disable security managers within runtime environments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for thwarting unauthorized attempts to disable security managers within runtime environments. As illustrated in this figure, exemplary system 100 may include one or more modules 102 for performing one or more tasks. For example, and as will be explained in greater detail below, exemplary system 100 may include a monitoring module 104 that (1) monitors a runtime environment that (A) facilitates execution of an application and (B) includes a security manager that prevents the application from performing unauthorized actions while running within the runtime environment and (2) detects, while monitoring the runtime environment, an attempt to disable the security manager such that the security manager no longer prevents the application from performing the unauthorized actions. Exemplary system 100 may also include a determination module 106 that (1) identifies a source of the attempt to disable the security manager and then (2) determines that the source of the attempt is not authorized to disable the security manager.

In addition, and as will be described in greater detail below, exemplary system 100 may include a security module 108 that blocks the attempt to disable the security manager such that the security manager continues to prevent the application from performing the unauthorized actions while running within the runtime environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, computing device 202 may include a runtime environment 208 that facilitates the execution of an application 212. In this example, runtime environment 208 may include a security manager 210 that, when enabled, prevents application 212 from performing any unauthorized actions.

In one example, computing device 202 may also include an API 214 that facilitates disabling security manager 210. In this example, one or more of modules 102 may insert a hook 216 within API 214 to facilitate detecting any attempts to disable security manager 210.

Although FIG. 2 illustrates only one API and one hook, system 200 may alternatively include and/or involve numerous APIs and/or hooks that facilitate detecting attempts to disable security manager 210. Similarly, although FIG. 2 illustrates only one application running within runtime environment 208, system 200 may alternatively include and/or involve numerous applications running simultaneously within runtime environment 208. In addition, although API 214 is illustrated as being separate from runtime environment 208 in FIG. 2, API 214 may alternatively represent part of runtime environment 208 and/or a component specific or related to runtime environment 208.

In one example, server 206 may host application 212. Additionally or alternatively, server 206 may distribute, stream, and/or otherwise deliver application 212 to computing device 202 via network 204 for execution within and/or in connection with runtime environment 208.

In one embodiment, one or more of modules 102 from FIG. 1 may, when executed by at least one processor of computing device 202, enable computing device 202 to thwart unauthorized attempts to disable security managers within runtime environments. For example, and as will be described in greater detail below, one or more of modules 102 may cause computing device 202 to (1) monitor runtime environment 208 that (A) facilitates execution of application 212 and (B) includes security manager 210, (2) detect, while monitoring runtime environment 208, an attempt to disable security manager 210 such that security manager 210 no longer prevents application 212 from performing the unauthorized actions, (3) identify a source of the attempt to disable security manager 210, (4) determine that the source of the attempt is not authorized to disable security manager 210, and then in response to determining that the source of the attempt is not authorized to disable security manager 210, (5) block the attempt to disable security manager 210 such that security manager 210 continues to prevent application 212 from performing unauthorized actions while running within runtime environment 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), network devices, multimedia players, embedded systems, wearable devices (e.g., smart watches, smart glasses, etc.), gaming consoles, combinations of one or more of the same, exemplary computing system 410 in FIG. 4, or any other suitable computing device.

Runtime environment 208 generally represents any type or form of computing environment, tool, platform, and/or engine that facilitates the execution and/or launching of applications. In one example, runtime environment 208 may include and/or represent a virtual machine. Additionally or alternatively, runtime environment 208 may function in conjunction with a browser (not illustrated in FIG. 2) to launch applications accessed by a user of computing device 202 within the browser. For example, as a user of computing device 202 navigates to a webpage, runtime environment 208 may launch a virtual machine that executes the application in connection with the browser. Examples of runtime environment 208 include, without limitation, JAVA RUNTIME ENVIRONMENT, JAVA VIRTUAL MACHINE, ADOBE FLASH PLAYER, COMMON LANGUAGE RUNTIME, .NET FRAMEWORK, variations of one or more of the same, combinations of one or more of the same, or any other suitable runtime environment.

Security manager 210 generally represents any type or form of computing object, component, and/or module that defines and/or enforces a security policy for applications running within a runtime environment. For example, security manager 210 may include and/or represent a JAVA SECURITY MANAGER that defines and/or enforces security policies for applications running within the JAVA RUNTIME ENVIRONMENT. In this example, the security policies may specify and/or be used to determine which actions the applications are authorized to perform and/or prohibited from performing within the JAVA RUNTIME ENVIRONMENT.

Application 212 generally represents any type or form of application, program, and/or process capable of running within and/or in connection with a runtime environment. In one example, application 212 may include and/or represent an applet. For example, application 212 may include and/or represent a JAVA applet embedded in a webpage. In this example, the JAVA applet may be configured to run within and/or in connection with the JAVA RUNTIME ENVIRONMENT installed on computing device 202. Examples of application 212 include, without limitation, applets, web-based applets, JAVA applets, QUICKTIME media, FLASH media, WINDOWS MEDIA PLAYER media, 3-Dimensional (3D) modeling applets, browser games, variations of one or more of the same, combinations of one or more of the same, or any other suitable application.

API 214 generally represents any type or form of function and/or command or library of functions and/or commands that facilitate(s) interfacing with and/or performing specific tasks on a computing device and/or within a runtime environment. In one example, API 214 may include and/or represent a JAVA API and/or a function and/or command within a JAVA API. For example, API 214 may include and/or represent the "SecurityManager" class within the JAVA API. More specifically, API 214 may include and/or represent the "SetSecurityManager" class within the JAVA API. Additionally or alternatively, API 214 may include and/or represent any API that leads to and/or results in the execution of the "SetSecurityManager" class.

Hook 216 generally represents any type or form of modification and/or augmentation of code that facilitates intercepting function calls to an API. In one example, hook 216 may include and/or represent a modification and/or augmentation to API 214 that at least temporarily transfers the flow of execution from the original version of API 214 to another memory location and/or alternative code. For example, hook 216 may include and/or represent code (e.g., a jump instruction) inserted at the beginning or entry point of API 214. In this example, the code (sometimes referred to as a "trampoline") may temporarily transfer or divert the flow of execution from API 214 to another memory location where additional code is configured to analyze the call stack whenever API 214 is called. By analyzing the call stack in this way, the additional code may be able to trace the corresponding API call back to the source (e.g., the application that initiated the API call) to determine whether the source is authorized to perform the action that would result from the API call. Examples of hook 216 include, without limitation, API hooks, user mode hooks, kernel mode hooks, physical-modification hooks, runtime-modification hooks, event hooks, virtual hooks, netfilter hooks, variations of one or more of the same, combinations of one or more of the same, or any other suitable hook.

Server 206 generally represents any type or form of computing device capable of hosting, distributing, streaming, and/or delivering an application. Examples of server 206 include, without limitation, application servers and database servers configured to provide various database services and/or run certain software applications. Examples of server 206 include, without limitation, application servers, web servers, storage servers, deduplication servers, security servers, and/or database servers configured to run certain software applications and/or provide various web, storage, deduplication, security, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 500 in FIG. 5, variations of one or more of the same, combinations of one or more of the same, or any other suitable network. Network 204 may facilitate communication or data transfer using wireless and/or wired connections. In one embodiment, network 204 may facilitate communication between computing device 202 and server 206.

Figure 3:
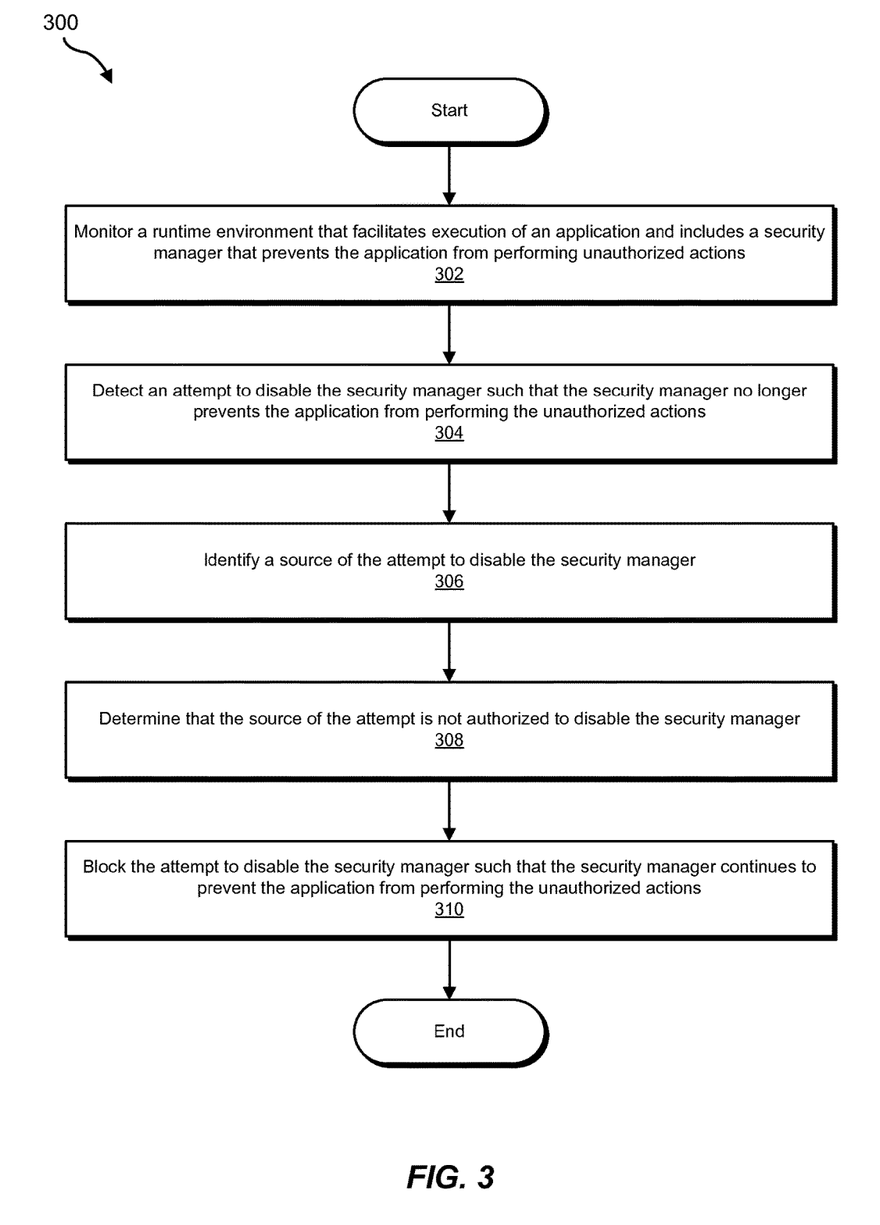
FIG. 3 is a flow diagram of an exemplary method for thwarting unauthorized attempts to disable security managers within runtime environments.

FIG. 3 is a flow diagram of an exemplary computer-implemented method 300 for thwarting unauthorized attempts to disable security managers within runtime environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may monitor a runtime environment that facilitates execution of an application and includes a security manager that prevents the application from performing unauthorized actions while running within the runtime environment. For example, monitoring module 104 may, as part of computing device 202 in FIG. 2, monitor runtime environment 208 that facilitates execution of application 212. In this example, runtime environment 208 may include security manager 210 that prevents application 212 from performing unauthorized actions while running within runtime environment 208.

The term "unauthorized action," as used herein, generally refers to any type or form of computing action and/or task that a security manager prevents an application from executing while the security manager is enabled. However, the security manager may be unable to prevent the application from executing such an unauthorized action while the security manager is disabled.

The systems described herein may perform step 302 in a variety of ways and/or contexts. In one example, monitoring module 104 may monitor runtime environment 208 by inserting one or more hooks within one or more APIs that facilitate disabling security manager 210. For example, monitoring module 104 may insert hook 216 within API 214 to detect whenever API 214 is called in an attempt to disable security manager 210. In this example, API 214 may include and/or represent any API that itself disables security manager 210 upon being called. Additionally or alternatively, API 214 may include and/or represent any API that calls another API to disable security manager 210, thereby indirectly leading to and/or resulting in the disabling of security manager 210.

As specific example, monitoring module 104 may insert hook 216 into any APIs potentially involved in directing runtime environment 208 to execute a "System.setSecurityManager(null)" call. For example, monitoring module 104 may insert hook 216 into the "SecurityManager" JAVA API. Additionally or alternatively, monitoring module 104 may insert hook 216 into any or all APIs along certain code paths that lead to the "SecurityManager" JAVA API. By inserting hook 216 in at least one of these ways, monitoring module 104 may be able to detect any attempts to disable security manager 210 by way of a "System.setSecurityManager(null)" call.

In one example, monitoring module 104 may monitor runtime environment 208 by intercepting certain API calls made by applications running within runtime environment 208. For example, monitoring module 104 may intercept all calls to an API used to disable security manager 210. Additionally or alternatively, monitoring module 104 may intercept all calls to another API capable of leading to and/or resulting in the calling of the API used to disable security manager 210. In other words, monitoring module 104 may monitor the API itself that disables security manager 210 and/or any code paths that lead to the API that disables security manger 210.

Returning to FIG. 3, at step 304 one or more of the systems described herein may detect an attempt to disable the security manager while monitoring the runtime environment. For example, monitoring module 104 may, as part of computing device 202 in FIG. 2, detect an attempt to disable security manager 210 while monitoring runtime environment 208. In this example, the attempt may be configured and/or intended to disable security manager 210 such that security manager 210 no longer prevents applications (such as application 212) from performing unauthorized actions while running within runtime environment 208.

The systems described herein may perform step 304 in a variety of ways and/or contexts. In one example, monitoring module 104 may detect the attempt to disable security manager 210 based at least in part on hook 216. For example, monitoring module 104 may detect a call to API 214 by hooking the call with hook 216 inserted within API 214. Additionally or alternatively, monitoring module 104 may detect a call to another API capable of disabling security manager 210 by hooking the call with hook 216 inserted within API 214. In other words, monitoring module may detect the call to the API capable of disabling security manager 210 by hooking the call along a code path leading to that API.

As specific example, monitoring module 104 may detect the attempt to disable security manager 210 by identifying a "System.setSecurityManager(null)" call at hook 216. In the event that runtime environment 208 and/or computing device 202 were to execute this "System.setSecurityManager(null)" call, security manager 210 may be disabled. As a result, application 212 may be able to perform unauthorized actions while running within runtime environment 208. Additionally or alternatively, additional applications (not illustrated in FIG. 2) that are running within runtime environment 208 may be able to perform unauthorized actions.

Returning to FIG. 3, at step 306 one or more of the systems described herein may identify a source of the attempt to disable the security manager. For example, determination module 106 may, as part of computing device 202 in FIG. 2, identify a source of the attempt to disable security manager 210. In this example, determination module 106 may initiate the identification process in response to the detection of the attempt to disable security manager 210. The term "source," as used herein in connection with an attempt to disable a security manager, generally refers to any type or form of computing device and/or application that initiated the attempt to disable the security manager.

In one example, the source of the attempt may include and/or represent application 212. In another example, the source of the attempt may include and/or represent another application (not illustrated in FIG. 2) running within runtime environment 208.

The systems described herein may perform step 306 in a variety of ways and/or contexts. In some examples, determination module 106 may identify the source of the attempt to disable security manager 210 based at least in part on the origin of the API call. In one example, upon intercepting and/or catching an API call, hook 216 may essentially cause the flow of execution to temporarily transfer and/or divert from the called API to a different function or section of code that facilitates analyzing the API call and/or tracing the API call back to its source. For example, once hook 216 intercepts and/or catches the API call, determination module 106 may trace the code path of the API call back to its source by examining the call stack of runtime environment 208 for evidence (such as process identifiers, requests, and/or timestamps) indicating and/or leading to the identity of the source. By tracing the API call in this way, determination module 106 may be able to determine that the API call originated from application 212 and/or deduce or discover the identity of the source as being application 212.

In another example, determination module 106 may identify the source of the attempt to disable security manager 210 by calling a tracing API. For example, determination module 106 may call and/or invoke the "StackTraceElement" JAVA API to trace the API call detected by hook 216. By calling and/or invoking the "StackTraceElement" JAVA API in this way, determination module 106 may be able to use this JAVA API to determine that the API call originated from application 212 and/or deduce or discover the identity of the source as being application 212.

In a further example, determination module 106 may identify the source of the attempt to disable security manager 210 based at least in part on information recorded in connection with applications running within runtime environment 208. For example, monitoring module 104 may log and/or record information about API calls made by applications running within runtime environment 208. Additionally or alternatively, monitoring module 104 may direct runtime environment 208 to log and/or record information about API calls made by such applications. In either case, once hook 216 intercepts and/or catches the API call, determination module 106 may trace the code path of the API call back to its source by examining the information logged and/or recorded about API calls. By tracing the API call in this way, determination module 106 may be able to determine that the API call originated from the application 212 and/or deduce or discover the identity of the source as being application 212.

Returning to FIG. 3, at step 308 one or more of the systems described herein may determine that the source of the attempt is not authorized to disable the security manager. For example, determination module 106 may, as part of computing device 202 in FIG. 2, determine that the source of the attempt is not authorized to disable security manager 210. Some processes (such as runtime environment 208 itself and/or signed or trusted third-party applications) may be authorized to disable security manager 210. In this example, determination module 106 may determine and/or ensure that the source of the attempt is not one of these authorized processes. Determination module 106 may initiate this determination process in response to the detection of the attempt to disable security manager 210.

The systems described herein may perform step 308 in a variety of ways and/or contexts. In one example, determination module 106 may determine that the source of the attempt is not authorized to disable security manager 210 by comparing the source of the attempt against a whitelist. In this example, the whitelist may include and/or identify certain processes that are authorized to disable security manager 210. For example, a whitelist may include and/or identify runtime environment 208 as being authorized to initiate API calls that disable security manager 210. In this example, determination module 106 may determine that application 212 is not authorized to disable security manager 210 by comparing the identity of application 212 against the whitelist.

Additionally or alternatively, the whitelist may include and/or identify certain attributes that indicate whether a process is authorized to disable security manager 210. For example, a whitelist may indicate that any or all processes signed by a legitimate certificate authority (such as VERISIGN and/or THAWTE) are authorized to disable security manager 210. In this example, determination module 106 may determine that application 212 is not authorized to disable security manager 210 since application 212 is not signed by a legitimate certificate authority.

In one example, determination module 106 may determine that the source of the attempt is not authorized to disable security manager 210 by querying an authority engine. For example, determination module 106 may direct computing device 202 to query an external authority engine (not illustrated in FIG. 2) via network 204 as to whether application 212 is authorized to disable security manager 210. In this example, determination module 106 may determine that application 212 is not authorized to disable security manager 210 based at least in part on the result of the query and/or a response from the external query engine.

Returning to FIG. 3, at step 310 one or more of the systems described herein may block the attempt to disable the security manager in response to determining that the source of the attempt is not authorized to disable the security manager. For example, security module 108 may, as part of computing device 202 in FIG. 2, block the attempt to disable security manager 210 in response to the determination that the source of the attempt is not authorized to disable security manager 210. By blocking the attempt to disable security manager 210 in this way, security module 108 may enable security manager 210 to continue preventing application 212 from performing any unauthorized actions while running within runtime environment 208. In other words, security module 108 may ensure that security manager 210 is able to continue preventing application 212 from performing any unauthorized actions despite the attempt to disable security manager 210.

The systems described herein may perform step 310 in a variety of ways and/or contexts. In one example, security module 108 may block the attempt to disable security manager 210 by simply dropping the API call. For example, since application 212 is not authorized to disable security manager 210, security module 108 may direct runtime environment 208 and/or computing device 202 to ignore and/or refuse to execute the API call initiated by application 212 to disable security manager 210.

Additionally or alternatively, security module 108 may blacklist the source of the attempt to disable security manager 210 for security reasons. For example, security module 108 may add the name and/or process identifier of application 212 to a blacklist of runtime environment 208. Additionally or alternatively, security module 108 may direct runtime environment 208 to refuse to execute and/or launch application 212. Furthermore, security module 108 may direct runtime environment 208 to terminate any existing execution threads that involve application 212.

As explained above in connection with FIGS. 1-3, the systems and methods described herein may be able to detect and thwart unauthorized attempts to disable security managers within runtime environments. As a specific example, a JAVA RUNTIME ENVIRONMENT may enable a user of a computing device to access and/or view certain media content embedded in a webpage as a JAVA applet. As the user navigates to the webpage within a browser, the JAVA RUNTIME ENVIRONMENT may begin to execute the JAVA applet. In this example, the JAVA applet may initiate an API call configured and/or intended to disable the JAVA SECURITY MANAGER within the JAVA RUNTIME ENVIRONMENT.

Unfortunately, if the JAVA applet is able to successfully disable the JAVA SECURITY MANAGER, the JAVA applet may gain unauthorized control over the user's computing device. For example, upon disabling the JAVA SECURITY MANAGER, the JAVA applet may be able to (1) initiate malicious file downloads to the user's computing device, (2) transfer control of the user's computing device to a malicious hacker, and/or (3) export or modify certain data stored on the user's computing device.

In an effort to prevent the JAVA applet from gaining such control over the user's computing device, security software may monitor the JAVA RUNTIME ENVIRONMENT for suspicious API calls. For example, the security software insert hooks into various APIs used by applets running within the JAVA RUNTIME ENVIRONMENT. Such hooks may be strategically placed in relevant APIs to detect any "System.setSecurityManager(null)" calls (since these calls have been able to facilitate disabling the JAVA SECURITY MANAGER). In the event that one of these hooks intercepts and/or catches a "System.setSecurityManager(null)" call, the security software may trace the call back to its source and then determine whether the source of the call is authorized to disable the JAVA SECURITY MANAGER.

If the source of the call is not authorized to disable the JAVA SECURITY MANAGER, the security software may block the call. For example, if the JAVA applet is not signed by a certificate authority and is the source of the call, the security software may block the call such that the JAVA SECURITY MANAGER continues to prevent the JAVA applet from gaining unauthorized control over the user's computing device.

Figure 4:
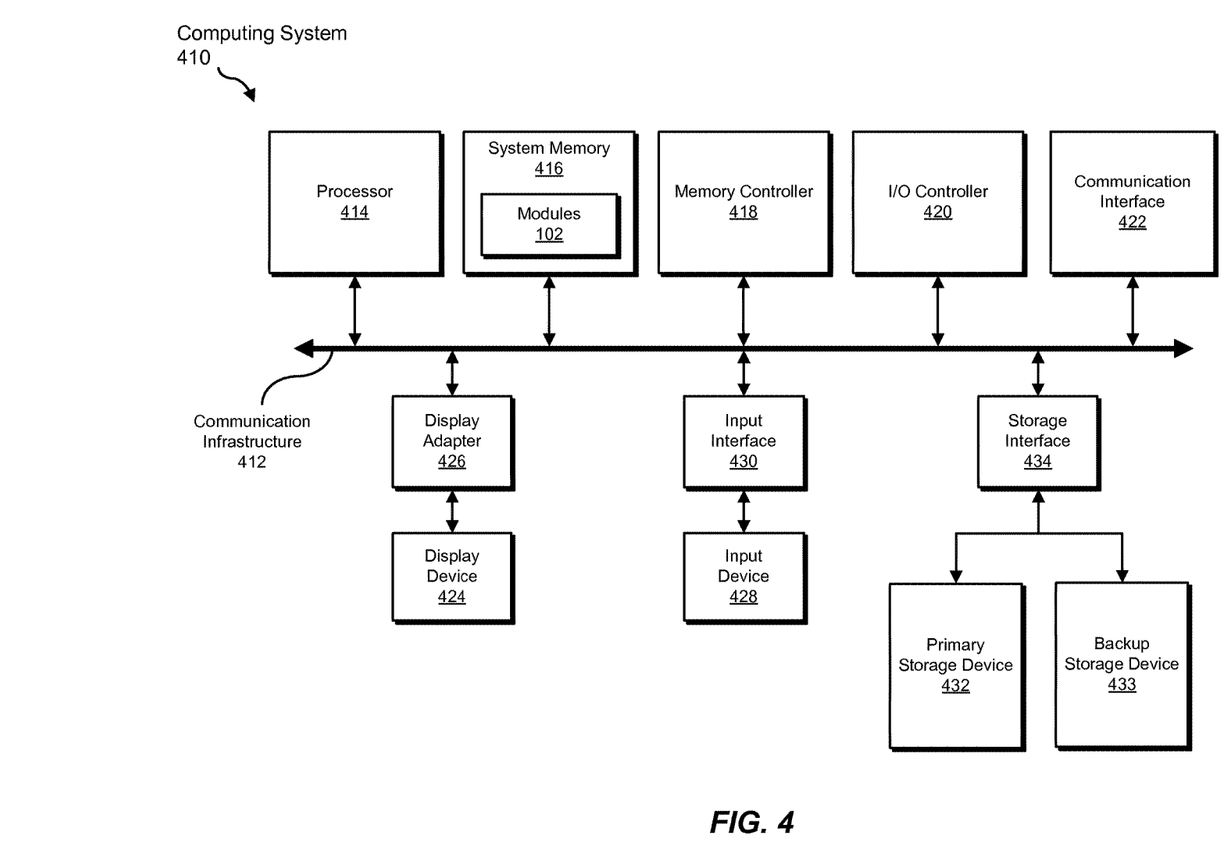
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
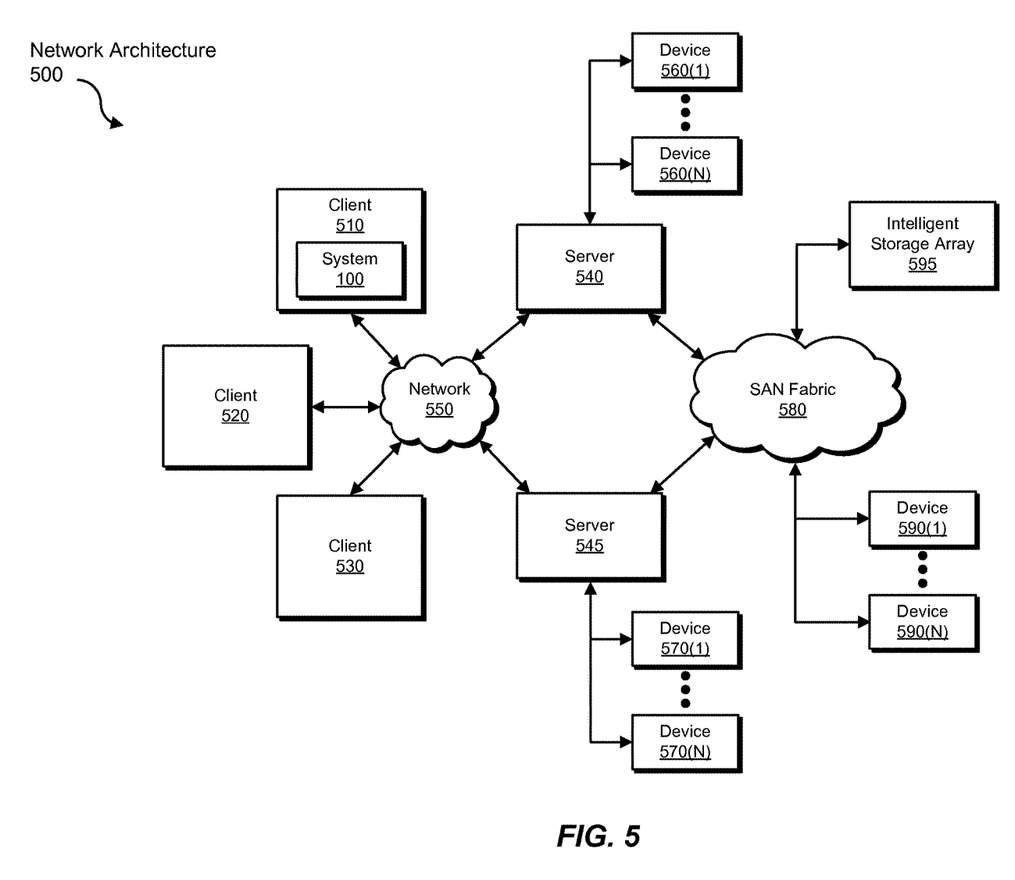
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for thwarting unauthorized attempts to disable security managers within runtime environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to security software, use the result of the transformation to thwart unauthorized attempts to disable a security manager, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for thwarting unauthorized attempts to disable security managers within runtime environments, at least a portion of the method being performed by a computing device comprising at least one processor, the method comprising:
   monitoring a runtime environment that:
      launches a virtual machine that executes a web-based application in response to a browser navigating to a webpage that hosts the web-based application; and
      includes a security manager that prevents the web-based application from performing unauthorized actions while running within the runtime environment;
   inserting a hook within an Application Programming Interface (API) that facilitates disabling the security manager to intercept each call to the API;

while monitoring the runtime environment, detecting an attempt to disable the security manager such that the security manager no longer prevents the web-based application from performing the unauthorized actions, wherein detecting the attempt to disable the security manager comprises detecting a call to the API by:
    hooking the call with the hook inserted within the API; and
    transferring the flow of execution from the API to a different function that facilitates identifying a source of the call;
in response to detecting the attempt to disable the security manager:
    identifying the source of the call to disable the security manager; and
    determining that the source of the call is not authorized to disable the security manager; and
in response to determining that the source of the call is not authorized to disable the security manager, blocking the attempt to disable the security manager such that the security manager continues to prevent the web-based application from performing the unauthorized actions while running within the runtime environment.

2. The method of claim 1, wherein determining that the source of the call is not authorized to disable the security manager comprises at least one of:
    ensuring that the source of the call is not the runtime environment; and
    determining that the source of the call is an unsigned application running within the runtime environment.

3. The method of claim 1, further comprising blacklisting the source of the call such that the source is no longer able to run within the runtime environment.

4. The method of claim 1, further comprising:
    detecting another attempt to disable the security manager such that the security manager no longer prevents the web-based application from performing the unauthorized actions;
    in response to detecting the other attempt to disable the security manager:
        identifying a source of the other attempt to disable the security manager; and
        determining that the source of the other attempt is authorized to disable the security manager; and
    in response to determining that the source of the other attempt is authorized to disable the security manager, refraining from blocking the other attempt such that the security manager is disabled.

5. The method of claim 1, wherein identifying the source of the call to disable the security manager comprises identifying the source as having initiated the call to the API by determining that the call to the API originated from the source.

6. The method of claim 5, wherein the source comprises at least one of:
    the web-based application executed by the virtual machine running within the runtime environment; and
    another application running within the runtime environment.

7. The method of claim 5, wherein determining that the call to the API originated from the source comprises tracing a code path of the call to the API back to the source.

8. The method of claim 7, wherein tracing the code path of the call to the API back to the source comprises:
    upon hooking the call to the API that facilitates disabling the security manager:
        examining a call stack of the runtime environment for evidence of an identity of the source; and
        while examining the call stack of the runtime environment, identifying evidence indicating that the attempt to disable the security manager originated from the source.

9. The method of claim 7, wherein tracing the code path of the call to the API back to the source comprises:
    upon hooking the call to the API that facilitates disabling the security manager:
        invoking a tracing API that traces the call back to the source; and
        determining that the call originated from the source based at least in part on the tracing API having traced the call back to the source.

10. A system for thwarting unauthorized attempts to disable security managers within runtime environments, the system comprising:
    a monitoring module, stored in memory, that:
        monitors a runtime environment that:
            launches a virtual machine that executes a web-based application in response to a browser navigating to a webpage that hosts the web-based application; and
            includes a security manager that prevents the web-based application from performing unauthorized actions while running within the runtime environment;
        inserts a hook within an Application Programming Interface (API) that facilitates disabling the security manager to intercept each call to the API;
        detects, while monitoring the runtime environment, an attempt to disable the security manager such that the security manager no longer prevents the web-based application from performing the unauthorized actions, wherein detecting the attempt to disable the security manager comprises detecting a call to the API by:
            hooking the call with the hook inserted within the API; and
            transferring the flow of execution from the API to a different function that facilitates identifying a source of the call;
    a determination module, stored in memory, that:
        identifies the source of the call to disable the security manager; and
        determines that the source of the call is not authorized to disable the security manager;
    a security module, stored in memory, that blocks the attempt to disable the security manager such that the security manager continues to prevent the web-based application from performing the unauthorized actions in response to the determination that the source of the call is not authorized to disable the security manager; and
    at least one physical processor configured to execute the monitoring module, the determination module, and the security module.

11. The system of claim 10, wherein the determination module identifies the source as having initiated the call to the API by determining that the call to the API originated from the source.

12. The system of claim 11, wherein the source comprises at least one of:
    the web-based application executed by the virtual machine running within the runtime environment; and another application running within the runtime environment.

13. The system of claim 11, wherein the determination module determines that the call to the API originated from the source by tracing a code path of the call to the API back to the source.

14. A non-transitory computer-readable medium comprising one or more computer-executable instructions that, when executed by at least one processor of a computing device, cause the computing device to:
monitor a runtime environment that:
  launches a virtual machine that executes a web-based application in response to a browser navigating to a webpage that hosts the web-based application; and
  includes a security manager that prevents the web-based application from performing unauthorized actions while running within the runtime environment;
insert a hook within an Application Programming Interface (API) that facilitates disabling the security manager to intercept each call to the API;
detect, while monitoring the runtime environment, an attempt to disable the security manager such that the security manager no longer prevents the web-based application from performing the unauthorized actions, wherein detecting the attempt to disable the security manager comprises detecting a call to the API by:
  hooking the call with the hook inserted within the API; and
  transferring the flow of execution from the API to a different function that facilitates identifying a source of the call;
identify, in response to detecting the attempt to disable the security manager, the source of the call to disable the security manager;
determine that the source of the call is not authorized to disable the security manager; and
block, in response to determining that the source of the call is not authorized to disable the security manager, the attempt to disable the security manager such that the security manager continues to prevent the web-based application from performing the unauthorized actions while running within the runtime environment.

* * * * *